(12) United States Patent
Babinski et al.

(10) Patent No.: US 7,839,600 B1
(45) Date of Patent: Nov. 23, 2010

(54) DISK DRIVE EMPLOYING DATA-BASED BASIS FUNCTION EXPANSION FOR TUNING SEEK SERVO LOOP

(75) Inventors: Alexander Babinski, Laguna Niguel, CA (US); Orhan Beker, Aliso Viejo, CA (US); Duc T. Phan, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/434,979

(22) Filed: May 4, 2009

(51) Int. Cl.
*G11B 5/596* (2006.01)
(52) U.S. Cl. .............. 360/78.06; 360/78.04; 360/78.14
(58) Field of Classification Search ................ None
See application file for complete search history.

(56) References Cited

U.S. PATENT DOCUMENTS

| | | | |
|---|---|---|---|
| 6,031,684 A | 2/2000 | Gregg | |
| 6,490,120 B1 | 12/2002 | Burton et al. | |
| 6,501,613 B1 | 12/2002 | Shih | |
| 6,563,663 B1 | 5/2003 | Bi et al. | |
| 6,636,377 B1 | 10/2003 | Yu et al. | |
| 6,686,716 B1 | 2/2004 | Predina et al. | |
| 6,999,267 B1 | 2/2006 | Melkote et al. | |
| 7,170,581 B2 | 1/2007 | Tousain | |
| 7,298,574 B1 | 11/2007 | Melkote et al. | |
| 7,626,782 B1 * | 12/2009 | Yu et al. | 360/78.04 |
| 2002/0006010 A1 * | 1/2002 | Ding et al. | 360/78.06 |

OTHER PUBLICATIONS

Yangquan Chen, et al., "Iterative Learning Control and Repetitive Control in Hard Disk Drive Industry—A Tutorial", Proceedings 2006 IEEE Conference on Decision and Control, San Diego, CA, Dec. 2006, 14 pages.
Mingxuan Sun, et al., "Closed-loop iterative learning control for non-linear systems with initial shifts", International Journal of Adaptive Control Signal Process, 16 (7), 2002, pp. 515-538.
Douglas A. Bristow, et al., "A Survey of Iterative Learning Control A learning-based method for high-performance tracking control", IEEE Control Systems Magazine, Jun. 2006, vol. 26, pp. 96-114.
F. L. Lewis, et al., "System Inversion using Orthogonal Functions*", Circuits Systems Signal Process, vol. 6, No. 3, 1987, pp. 347-362.

* cited by examiner

*Primary Examiner*—Andrew L Sniezek

(57) ABSTRACT

A method of tuning a seek operation of a disk drive is disclosed, the disk drive comprising a disk, an actuator arm, a head coupled to a distal end of the actuator arm, a voice coil motor (VCM) for rotating the actuator arm about a pivot, and a closed loop servo system for generating a VCM control signal applied to the VCM. A function h is applied to the closed loop servo system and a corresponding output g of the closed loop servo system is measured. A reference signal is generated in response to a summation of a plurality of the function h, wherein each of the plurality of the function h is shifted by an offset and scaled by a coefficient, and the coefficients are generated in response to the measured output g.

14 Claims, 5 Drawing Sheets

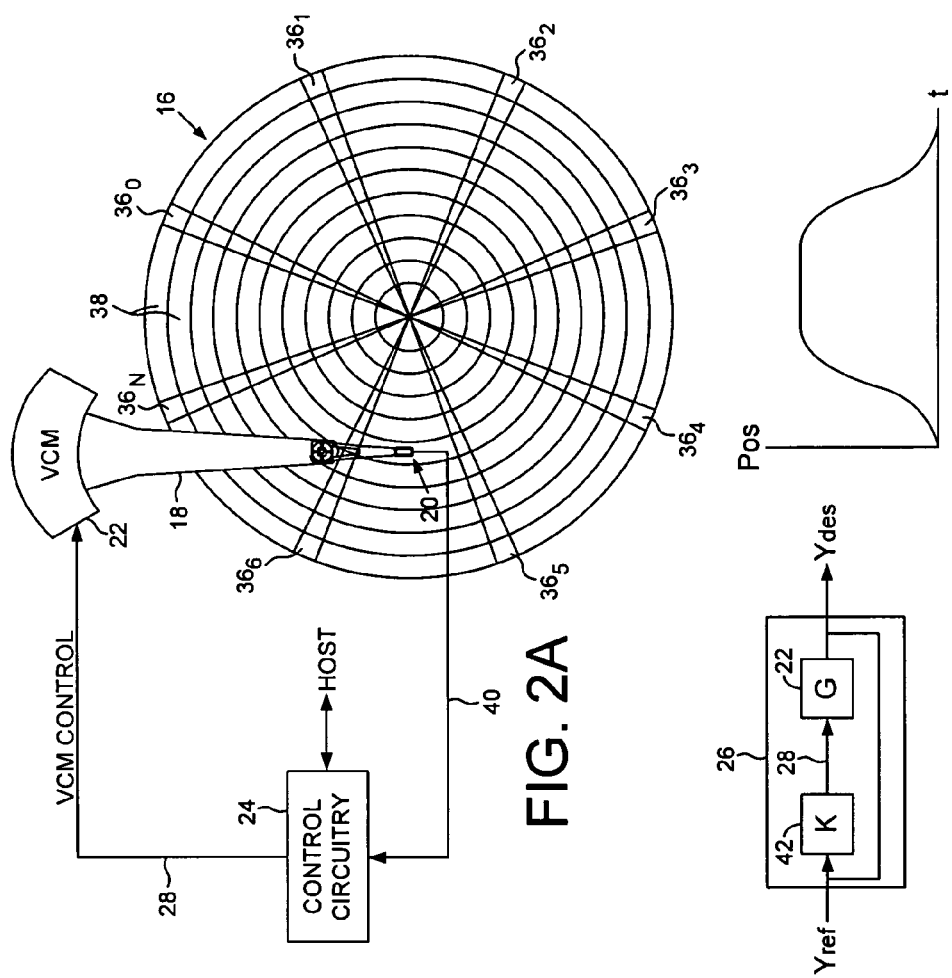
FIG. 2A
FIG. 2B
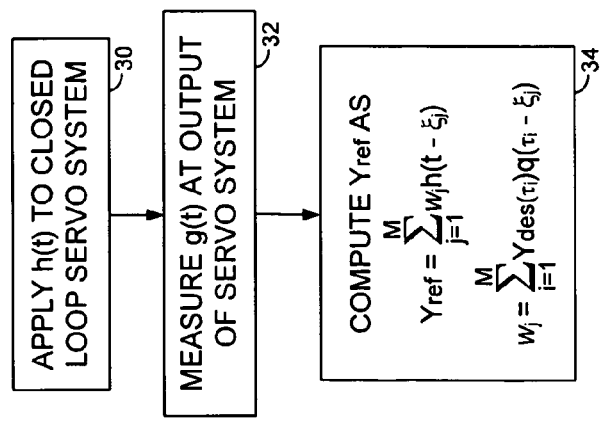
FIG. 2C

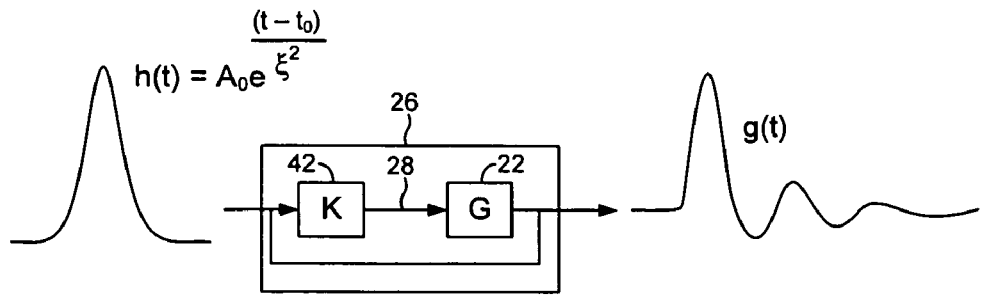

$$h(t) = A_0 e^{\frac{(t-t_0)}{\xi^2}}$$

FIG. 3A $$\sum_{j=1}^{M} w_j h(t - \xi_j) \quad \Longleftrightarrow \quad \sum_{j=1}^{M} w_j g(t - \xi_j)$$
$$\text{LTI}$$

FIG. 3B $$Y_{ref}(k) = \sum_{j=0}^{M-1} w_j h_j(k) \qquad w_j = \frac{1}{N+1} \sum_{i=0}^{N} Y_{des}(i) q_j(i)$$

FIG. 3C $$q(k) = \frac{1}{M} \sum_{i=0}^{N} \left( \sum \frac{v_{-n}^{m}}{\lambda_m} \right) g_n(k)$$

$$h_j(k) = h(<(N+1) - j\frac{(N+1)}{M} + k>_{(N+1)}) \qquad g_n(k) = g(<(N+1) - n\frac{(N+1)}{M} + k>_{(N+1)})$$

$$q_j(k) = q(<(N+1) - j\frac{(N+1)}{M} + k>_{(N+1)}) \qquad v_{-n} = e^{\frac{-i 2\pi n}{M}}$$

$$\lambda_m = M \sum_j \left| a_{m-j} \right|^2 \quad j = 0, \pm M, \pm 2M \ldots, \qquad a_n = \frac{1}{N+1} \sum_{k=0}^{N} g(k) v_k^{-n}$$

$$<k>_M \equiv k \bmod M = r; \; k = lM + r, \; 0 \le r \le M - 1$$

FIG. 3D

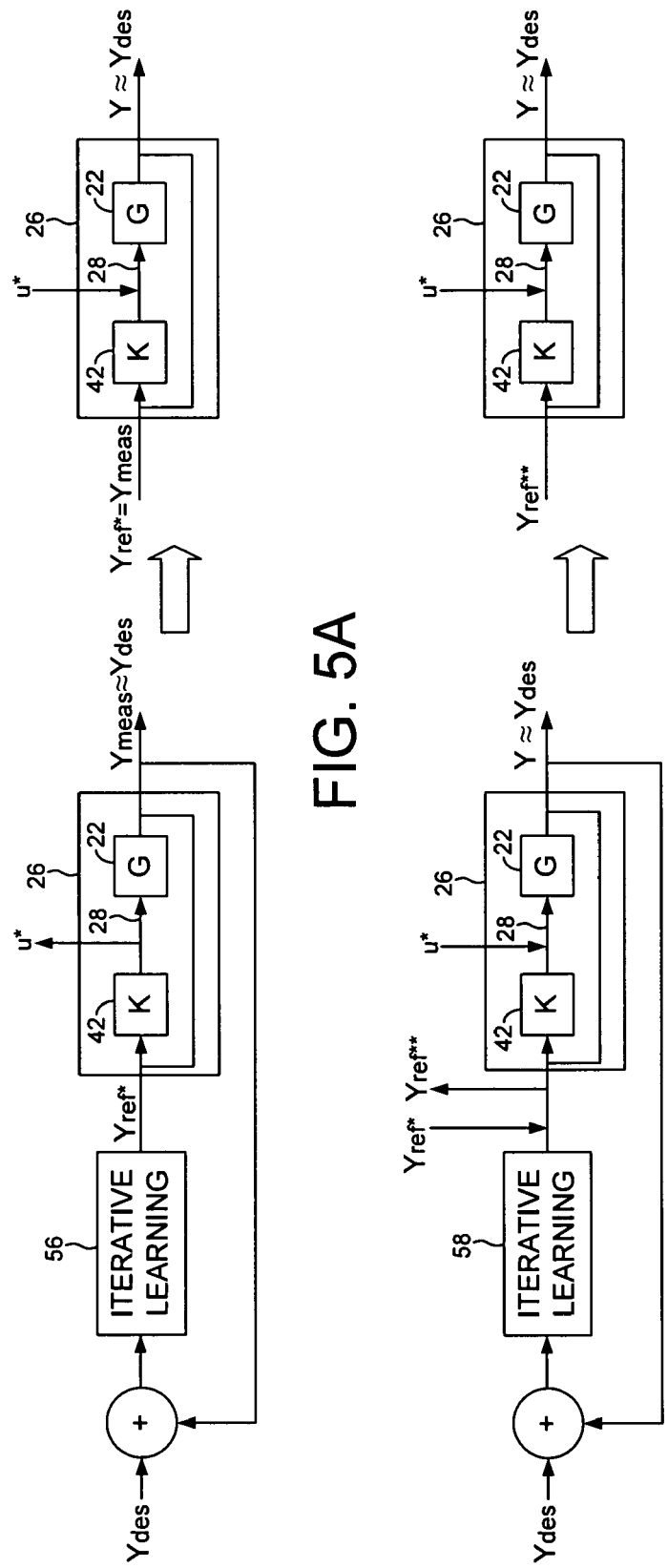

DISK DRIVE EMPLOYING DATA-BASED BASIS FUNCTION EXPANSION FOR TUNING SEEK SERVO LOOP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of data tracks 6 defined by servo sectors $4_0$-$4_N$ recorded around the circumference of each data track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 4, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 2A shows a disk drive according to an embodiment of the present invention including a head actuated over a disk by a VCM.

FIG. 2B shows a closed loop servo system for controlling the VCM and a corresponding seek trajectory.

FIG. 2C shows a flow diagram according to an embodiment of the present invention for generating a reference signal applied to the closed loop servo system to generate the desired seek trajectory.

FIG. 3A shows an embodiment of the present invention wherein a function h is applied to the closed loop servo system and an output g is measured.

FIG. 3B illustrates how a linear combination of the function h will result in a corresponding linear combination of the output g.

FIG. 3C shows an embodiment of the present invention wherein the reference signal can be represented as a linear combination of time-shifted, weighted versions of h, wherein the weights (coefficients) can be generated in response to the measured output g.

FIG. 3D shows an embodiment of the present invention wherein the coefficients are generated in response to a dual basis function generated using a discrete Fourier transform of the measured output g.

FIG. 5A shows an embodiment of the present invention wherein the VCM control signal is saved while adapting the coefficients and then used as a feed-forward control signal during normal operation.

FIG. 5B shows an embodiment of the present invention wherein while applying the feed-forward control signal, the reference signal is adapted using iterative learning control.

DETAILED DESCRIPTION OF EMBODIMENTS OF THE INVENTION

Figure 1:
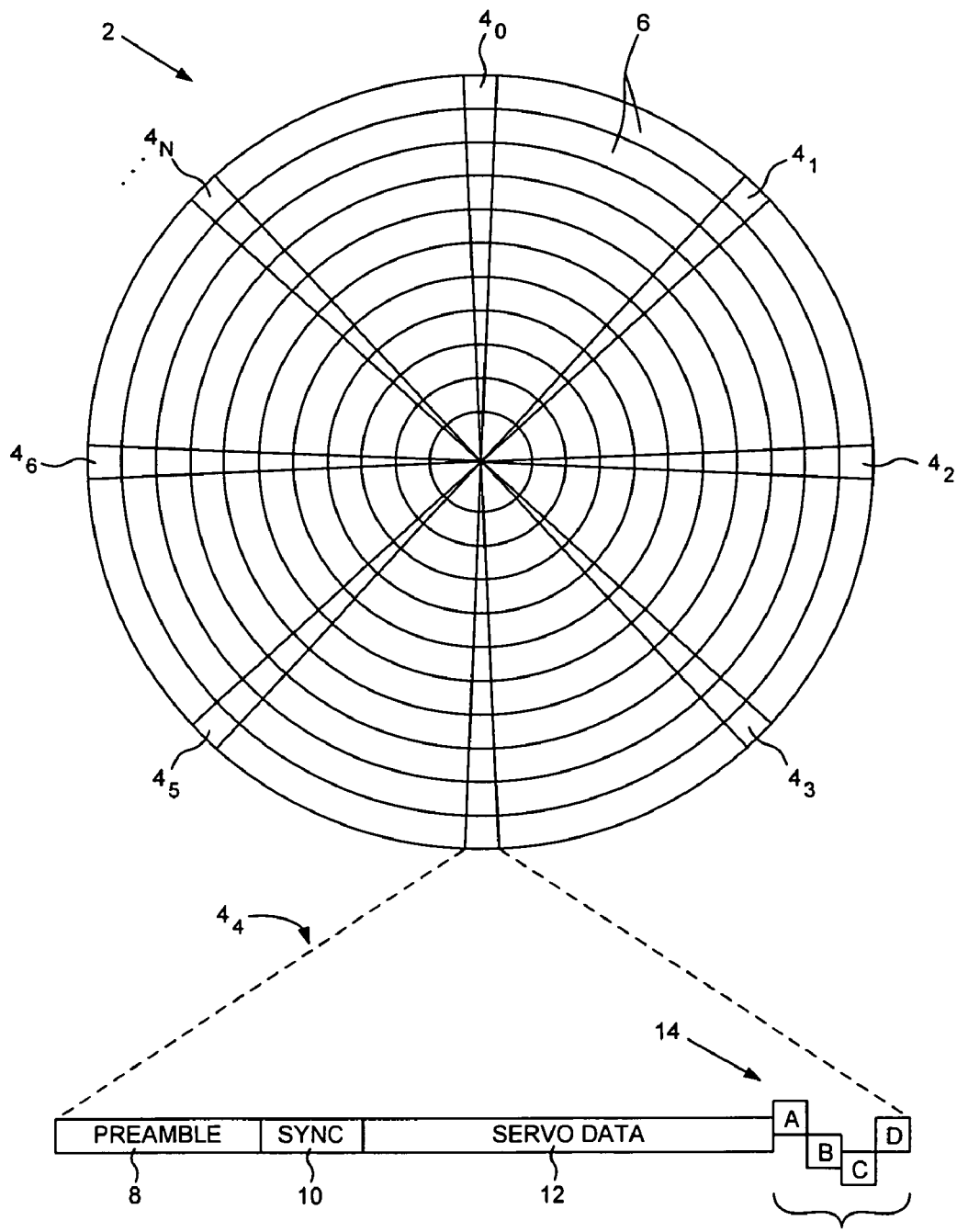
FIG. 1 shows a prior art disk format comprising a plurality of data tracks defined by embedded servo sectors.

FIG. 2C shows a method of tuning a seek operation of a disk drive of FIG. 2A according to an embodiment of the present invention. The disk drive comprises a disk 16, an actuator arm 18, a head 20 coupled to a distal end of the actuator arm 18, a voice coil motor (VCM) 22 for rotating the actuator arm 18 about a pivot, and control circuitry 24 including a closed loop servo system 26 (FIG. 2B) for generating a VCM control signal 28 applied to the VCM 22. A function h is applied to the closed loop servo system (step 30) and a corresponding output g of the closed loop servo system is measured (step 32). A reference signal is generated in response to a summation of a plurality of the function h, wherein each of the plurality of the function h is shifted by an offset and scaled by a coefficient, and the coefficients are generated in response to the measured output g (step 34).

In the embodiment of FIG. 2A, the disk 16 comprises a plurality of servo sectors $36_0$-$36_N$ that define a plurality of data tracks 38. The control circuitry 24 processes a read signal 40 to demodulate the servo sectors $36_0$-$36_N$ into an estimated state of the VCM 22 (e.g., position and/or velocity). In one embodiment during a seek operation, the estimated state of the VCM 22 is compared to a reference signal Yref to generate an error signal. A compensation filter 42 in the closed loop servo system 26 filters the error signal to generate the VCM control signal 28 so that the state of the VCM follows a desired seek profile (FIG. 2B). The servo sectors $36_0$-$36_N$ may comprise any suitable position information, such as a track address for coarse positioning information and servo bursts for fine positioning information.

Ideally, the reference signal Yref is generated so that the error signal is substantially zero during the seek operation. That is, a reference signal Yref can be generated such that the desired output Ydes matches the desired seek profile shown in FIG. 2B so that the error signal is zero. In one embodiment, the reference signal Yref is generated as a summation of a plurality of a function h, wherein each of the plurality of the function h is shifted by an offset and scaled by a coefficient. This embodiment is understood with reference to FIG. 3A wherein if a function h is applied to the closed loop servo system 26, the resulting output g can be measured. Since the closed loop servo system is a linear time invariant system, a summation of the function h shifted by an offset and scaled by a coefficient will generate a summation of the function g shifted by the offset and scaled by the same coefficient (FIG. 3B). Therefore, if the function representing the desired output Ydes of the VCM is represented as a summation of the function g shifted by an offset and scaled by a coefficient, then the corresponding function representing the reference signal Yref can be generated as a summation of the function h shifted by the offsets and scaled by the same coefficients. In an embodiment shown in FIG. 3C, the coefficients may be generated in response to the measured output g and the desired output Ydes of the VCM corresponding to the desired seek profile during a seek operation. In one embodiment, the coefficients wj are generated in response to a dual basis function q computed using a discrete Fourier transform of the measured output g, wherein the dual basis function q may be generated according to the equations shown in FIG. 3D.

Figure 4:
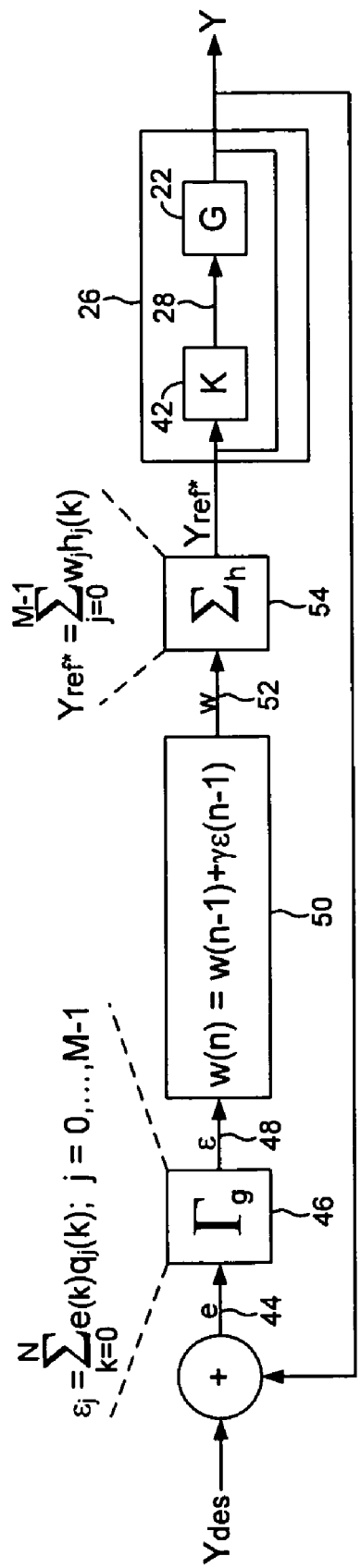
FIG. 4 shows an embodiment of the present invention wherein the coefficients are adapted using iterative learning control.

FIG. 4 shows an embodiment of the present invention wherein the coefficients w are adapted using iterative learning control. In this embodiment, the desired output of the VCM Ydes is subtracted from a measured output of the VCM Y during a seek operation to generate an error signal 44. The error signal 44 is combined with the dual basis function q 46 to generate a set of M×1 expansion coefficients ϵ(n−1) 48 for adapting 50 the M coefficients w. The adapted coefficients w 52 are then used to generate 54 the reference signal Yref* applied to the closed loop servo system 26. After a number of iterations (a number of seek operations) the coefficients w will take on values that cause the error signal 44 to converge to substantially zero.

FIG. 5A shows an embodiment of the present invention wherein the VCM control signal u* is saved while adapting the coefficients using iterative learning 56, and then used as a feed-forward control signal u* during normal operation. In this embodiment, the measured output of the VCM Ymeas after adapting the coefficients is also saved and used as the reference signal Yref* during normal operation. In this manner, the feed-forward control signal u* will cause the output of the closed loop servo system to substantially follow the desired seek profile, and deviations from the expected behavior (e=Y−Yref*) will be compensated by the closed loop servo system 26.

FIG. 5B shows an embodiment of the present invention wherein while applying the feed-forward control signal u*, the reference signal Yref* is adapted using iterative learning control 58. This embodiment may help compensate for any mismatch between the desired and observed behavior, and/or average out potential differences due to variation of system response across the stroke of the actuator arm. In this embodiment, the feed-forward signal u* and the reference signal Yref* are used as exogenous signals to the system and a small correction to Yref* is determined using the iterative learning 58. After a number of iterations (a number of seek operations), the reference signal Yref* will converge to the desired values.

In one embodiment, the reference signal Yref* (and optionally the feed-forward control signal u*) may be determined for a number of different length seek operations. These values are then stored in a table indexed by the seek length during normal operation.

In one embodiment, the reference signal Yref* (and optionally the feed-forward control signal u*) may be determined during development of a family of disk drives, and nominal values copied into each production disk drive. In an alternative embodiment, the reference signal Yref* (and optionally the feed-forward control signal u*) may be determined (or tuned) by the control circuitry 24 in each production disk drive. The reference signal Yref* (and optionally the feed-forward control signal u*) may be determined once during a manufacturing procedure, and/or they may be tuned periodically during the life of the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of tuning a seek operation of a disk drive, the disk drive comprising a disk, an actuator arm, a head coupled to a distal end of the actuator arm, a voice coil motor (VCM) for rotating the actuator arm about a pivot, and a closed loop servo system for generating a VCM control signal applied to the VCM, the method comprising:
   applying an initial function h to the closed loop servo system and measuring a corresponding output g of the closed loop servo system; and
   generating a reference signal in response to a summation of a plurality of functions, wherein:
      each of the plurality of functions is shifted by an offset from the initial function h and scaled by a coefficient; and
      the coefficients are generated in response to the measured output g.

2. The method as recited in claim 1, wherein the coefficients are generated in response to a desired output Ydes of the VCM corresponding to a target seek profile.

3. The method as recited in claim 2, wherein the coefficients are generated in response to a dual basis function generated using a discrete Fourier transform of the measured output g.

4. The method as recited in claim 3, further comprising:
   generating a difference between a measured output of the VCM and a desired output of the VCM; and
   adapting the coefficients in response to the difference and the dual basis function.

5. The method as recited in claim 4, further comprising:
   saving the VCM control signal generated while adapting the coefficients; and
   using the saved control signal as a feed-forward control signal.

6. The method as recited in claim 5, further comprising adapting the reference signal using iterative learning control while applying the feed-forward control signal to the VCM.

7. The method as recited in claim 1, further comprising adapting the coefficients in response to a difference between a measured output of the VCM and a desired output of the VCM.

8. A disk drive comprising a disk, an actuator arm, a head coupled to a distal end of the actuator arm, a voice coil motor (VCM) for rotating the actuator arm about a pivot, and control circuitry including a closed loop servo system for generating a VCM control signal applied to the VCM, the control circuitry operable to:
   apply an initial function h to the closed loop servo system and measure a corresponding output g of the closed loop servo system; and generate a reference signal in response to a summation of a plurality of functions, wherein:

each of the plurality of functions is shifted by an offset from the initial function h and scaled by a coefficient; and the coefficients are generated in response to the measured output g.

9. The disk drive as recited in claim 8, wherein the control circuitry is further operable to generate the coefficients in response to a desired output Ydes of the VCM corresponding to a target seek profile.

10. The disk drive as recited in claim 9, wherein the control circuitry is further operable to generate the coefficients in response to a dual basis function generated using a discrete Fourier transform of the measured output g.

11. The disk drive as recited in claim 10, wherein the control circuitry is further operable to:

generate a difference between a measured output of the VCM and a desired output of the VCM; and adapt the coefficients in response to the difference and the dual basis function.

12. The disk drive as recited in claim 11, wherein the control circuitry is further operable to:

save the VCM control signal generated while adapting the coefficients; and use the saved control signal as a feed-forward control signal.

13. The disk drive as recited in claim 12, wherein the control circuitry is further operable to adapt the reference signal using iterative learning control while applying the feed-forward control signal to the VCM.

14. The disk drive as recited in claim 8, wherein the control circuitry is further operable to adapt the coefficients in response to a difference between a measured output of the VCM and a desired output of the VCM.

* * * * *